(12) United States Patent
Klein

(10) Patent No.: US 6,848,113 B2
(45) Date of Patent: Jan. 25, 2005

(54) OPTICAL MEDIA PICK AND PROCESS

(75) Inventor: John T. Klein, Mobile, AL (US)

(73) Assignee: Amtren Corporation, Montgomergy, AL (US)

( * ) Notice: Subject to any disclaimer, the term of this patent is extended or adjusted under 35 U.S.C. 154(b) by 531 days.

(21) Appl. No.: 09/897,257

(22) Filed: Jul. 2, 2001

(65) Prior Publication Data

US 2003/0002400 A1 Jan. 2, 2003

(51) Int. Cl.[7] ............................. G11B 21/08; G11B 7/85; G11B 17/04
(52) U.S. Cl. ..................... 720/619; 369/30.55
(58) Field of Search ................... 369/30.55, 30.34; 414/796.9; 294/93, 94

(56) References Cited

U.S. PATENT DOCUMENTS

| | | | |
|---|---|---|---|
| 4,604,024 A | * | 8/1986 | Edwards et al. ............ 414/592 |
| 4,754,445 A | * | 6/1988 | Young et al. ............ 369/30.86 |
| 5,158,331 A | * | 10/1992 | Wesselski et al. ............ 294/94 |
| 5,195,794 A | * | 3/1993 | Hummel, Jr. et al. ......... 294/94 |
| 5,503,446 A | * | 4/1996 | De Jong ....................... 294/94 |
| 5,505,509 A | * | 4/1996 | Vance ........................... 294/16 |
| 5,542,526 A | * | 8/1996 | Wurgler ....................... 294/93 |
| 5,734,629 A | | 3/1998 | Lee et al. |
| 5,873,692 A | | 2/1999 | Costas |
| 5,914,918 A | | 6/1999 | Lee et al. |
| 5,934,865 A | * | 8/1999 | Meadows ................ 414/796.9 |
| 5,946,216 A | | 8/1999 | Hollerich |
| 6,111,847 A | * | 8/2000 | Assadian ................. 369/30.55 |
| 6,220,640 B1 | * | 4/2001 | Jensen et al. ................. 294/93 |
| 2002/0009022 A1 | * | 1/2002 | Britz et al. .............. 369/30.34 |

FOREIGN PATENT DOCUMENTS

| | | | | | |
|---|---|---|---|---|---|
| JP | 01104532 A | * | 4/1989 | ............ | B65H/3/08 |
| WO | WO 99/26866 | * | 11/1998 | ........... | B65D/85/57 |

* cited by examiner

*Primary Examiner*—George J. Letscher
*Assistant Examiner*—Christopher R. Magee
(74) *Attorney, Agent, or Firm*—J. Bennett Mullinax, LLC

(57) ABSTRACT

A pick for a compact disc controller is provided in which a tip of the pick defines a plurality of flexible outer wall segments. An internal plunger is used to expand the wall segments in a radial direction, thereby retaining a CD onto the outer perimeter of the pick. Upon release of the plunger, the pick returns to its original dimensions and thereby releases the CD.

32 Claims, 6 Drawing Sheets

OPTICAL MEDIA PICK AND PROCESS

FIELD OF THE INVENTION

This invention is directed towards an apparatus and process for the selective engagement and release of a optical media disc such as a compact disc. The improved pick apparatus and operating process facilitates a rapid and accurate engagement of a single optical disc from a stack of discs and facilitates a transport of the engaged disc to a desired location, followed by the release of the disc.

BACKGROUND OF THE INVENTION

Compact discs are plastic discs on which data may be recorded by a stamping process or a laser process in which binary information is stored by selectively burning small areas along circumferential tracks on the disc. Conventional compact discs are about 12 cm in diameter, although various sizes of discs are becoming more common.

Irrespective of size, blank media discs, including CD, CD-R, and video discs, all undergo a similar recording process. Such processes typically involve a CD transporter having multiple bins for holding a quantity of stacked CDs. A positioner is used to place a CD to a desired position or location where the CD may be burned, labeled, and otherwise manipulated.

A variety of CD transport devices are known within the art as seen in reference to U.S. Pat. Nos. 5,734,629 and 5,919,918, assigned to Rimage Corporation, and which are incorporated herein by reference. The Rimage Corporation reference teaches a pick device in the form of a gripper having three expandable and contractable fingers for insertion into the center of a hole of the CD. The fingers expand and grasp the CD by its center hole for movement. The movement of the gripper fingers by controlled by a solenoid and computer processor.

U.S. Pat. No. 5,946,216, assigned to Cedar Technologies, Inc., and incorporated herein by reference, discloses a CD transport mechanism which uses a picking device to move individual discs between the various bins and stations. The Cedar Technologies reference uses a rotating plate to engage three fingers inserted into the hub of a CD. The fingers, in response to movement of a circular pivot plate, provide a selective engagement and release of the CD. The operation of the pick design requires a number of inter-connected moving parts which adds to the complexity and cost of the pick.

U.S. Pat. No. 8,573, 692 to Costas, incorporated herein by reference, discloses an apparatus and method for picking up a single compact disc from a stack of compact discs. The pick device uses three vertical opposing members that may be independently moved to form a tapered triangular section. Upon engagement of all three arms with the hub ring of the CD, the uppermost CD may be moved by the withdrawal of the arms from the stack of CDs. The Costas reference teaches that the center arms are preferably formed of stainless steel and provides means of moving each of the three arms in an independent manner. Such an arrangement adds to the mechanical complexity and cost of the pick apparatus.

While the above references represent advancements within the field of CD picks and automated systems for the manufacturing and recording of data on a CD, there remains room for variation and improvement in the art. In particular, there remains a need for a reliable CD pick which utilizes a minimum number of moving parts, may be constructed of low cost materials, and affords a high degree of reliability and maintenance-free operation.

SUMMARY OF THE INVENTION

It is a feature of the present invention to provide an improved pick for use with optical media such as CDs and video discs which is economical to construct and operate and which further provides for reliable and rapid operation. One such apparatus can be provided by an apparatus for engaging the center hub of an optical media disc comprising:

a pick having a first end, a second end, and defining a sleeve therebetween, the first end defining a base adapted for attachment to a positioning member and the second end defining a tip;

an axial passage defined by the pick and extending the length of the pick, the axial passage further defining an interior cross-sectional area along the base and the sleeve which is greater than the cross-sectional area of the axial passage defined within the tip;

the tip defining a plurality of slits, each one of said plurality of slits positioned substantially equidistance from each of an adjacent slit;

the tip defining a circular notch within an exterior surface of the tip;

wherein when the tip of the pick is inserted into a hub aperture of a media disc, the tip is pushed outwardly by a plunger inserted through the sleeve and engaging the axial passage wall of the tip, thereby pressing the notch against the hub, and securing the media disc to the pick.

It is yet another feature of the present invention to provide an improved process for the sequential handling of a single CD through the multiple positioning steps associated with burning in and printing a blank CD with data. One such process is provided by the steps comprising An apparatus for the selective engagement and release of a center hub of an optical media disc comprising:

a pick defining an axial passage therethrough, the pick having a first terminus and a second terminus, the second terminus defining a barbed head having a plurality of axially defined segments, each segment formed by a pair of slits extending substantially along the length of the barbed head; and, a groove defined by an exterior wall of the barbed head.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

Figure 1:
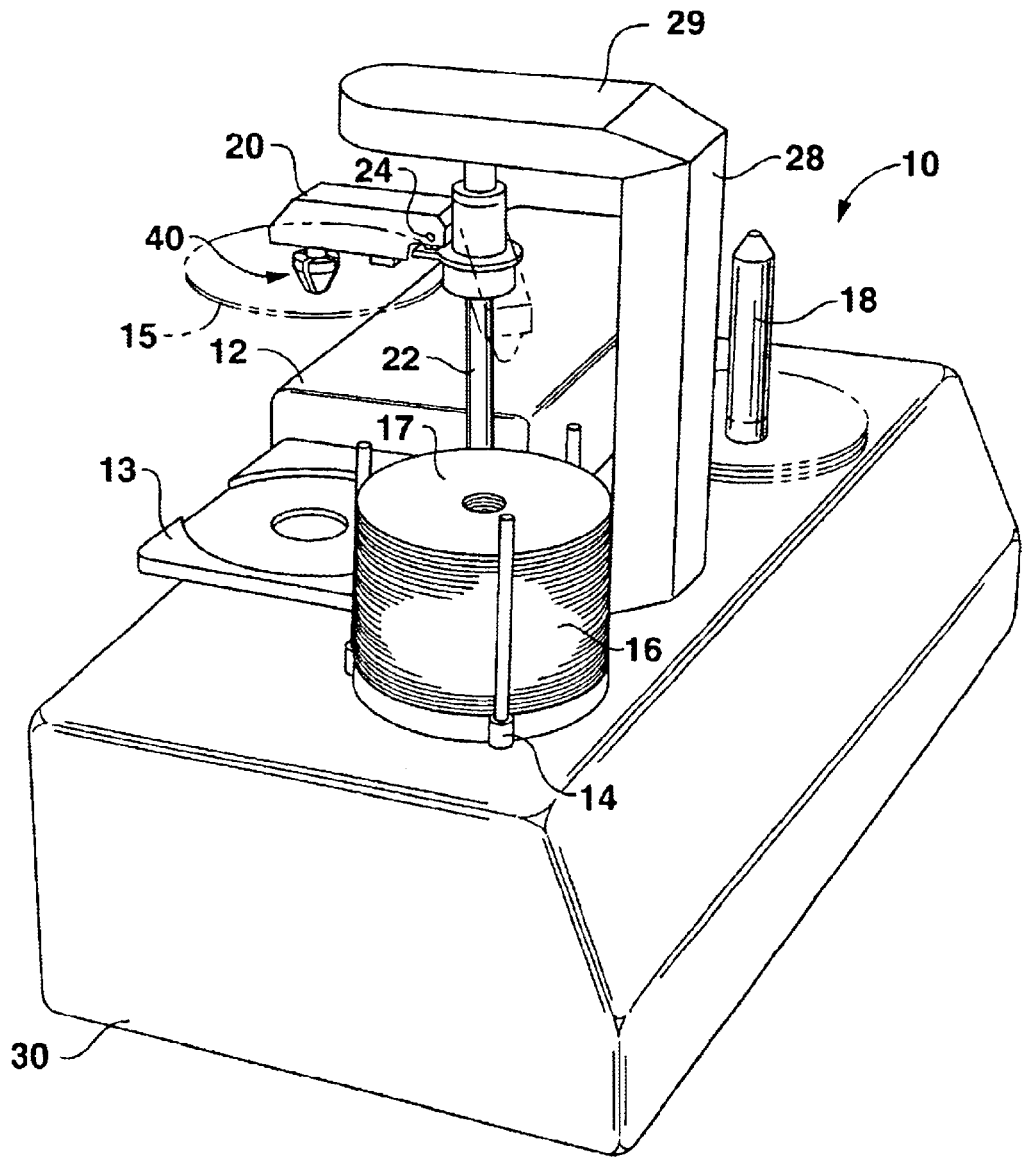
FIG. 1 is a perspective view of a optical media pick device of the present invention as seen in reference to a CD duplication/printer.

As best seen in reference to FIG. 1, a CD recorder and transporter 10 is provided for recording optical media discs such as compact discs and video discs. The recorder 10 comprises at least one CD drive 12 having a re-closable drawer 13 for receiving a single CD thereon. The magazine 14, seen here as a three-pronged holder is adapted for housing a plurality of CDs 16, each CD 16 defining a central hub ring 17.

The CD transporter 10 further supports a spindle 18 for receiving in a sequential manner a supply of burned-in CDs. An overhead arm 20 is used to position a pick 40 from a first location which operatively engages an uppermost CD 15 from the stack of CDs 16 and positions the CD to a second location which is in alignment with the open CD drive 13. Following recording of appropriate information on CD 15, arm 20 and pick 40 will again engage the now recorded CD 15 and transport the CD to a third location by placement and release of the CD onto spindle 18.

The movement of arm 20 is controlled by an actuator 26, actuator 26 allowing movement of arm 20 along the length of rail 22. Further, actuator 26 provides rotational movement of arm 20 about rail 22. Arm 20 may be attached to actuator 26 along the pivot 24 in a manner that will be described in more detail below. Rail 22 is maintained in position by an "L"-shaped bracket formed by an upright 28 and an overhead support member 29.

As seen in reference to FIG. 1, the CD handling equipment referenced above is mounted along an upper surface of a housing 30. An interior of housing 30 contains a microprocessor, key pad input, and conventional control systems as well known in the art to operate the CD drive and copying equipment.

Figure 2:
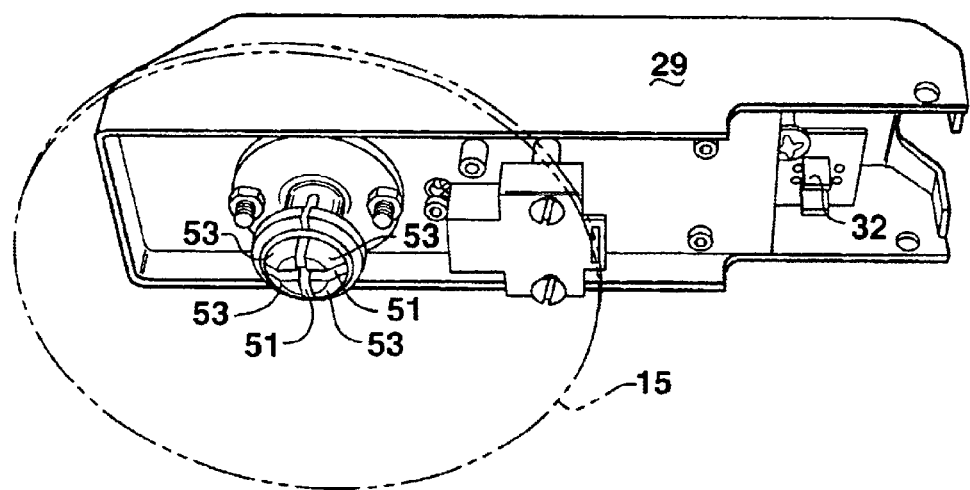
FIG. 2 is a perspective view of the optical media pick device positioned along a bottom of a drive arm.

In reference now to FIG. 2, the arm 20 is seen engaging an optical media pick 40. Pick 40 is mounted by its base 42 to a surface of arm 20 using conventional attachment hardware such as threaded bolts. As better seen in reference to FIGS. 3–6, FIG. 4a further defines a sleeve 44 which connects the base 42 to a terminal tip 46. Pick 40 defines a first axial passage 48 extending from the base 42 and through sleeve 44. Hereafter, the passage narrows via a taper to a reduced diameter passage 50 which traverses a flat terminus 64 of tip 46. Tip 46 and sleeve 44 further defines a plurality of axial slits 51. Slits 51 are in communication with the interior passages 48 and 50. Preferably, these slits 51 bisect the tip into at least two substantially equal halves. As illustrated in the preferred embodiment, the tip 46 is divided into four substantially equal segments 53.

Figure 4A:
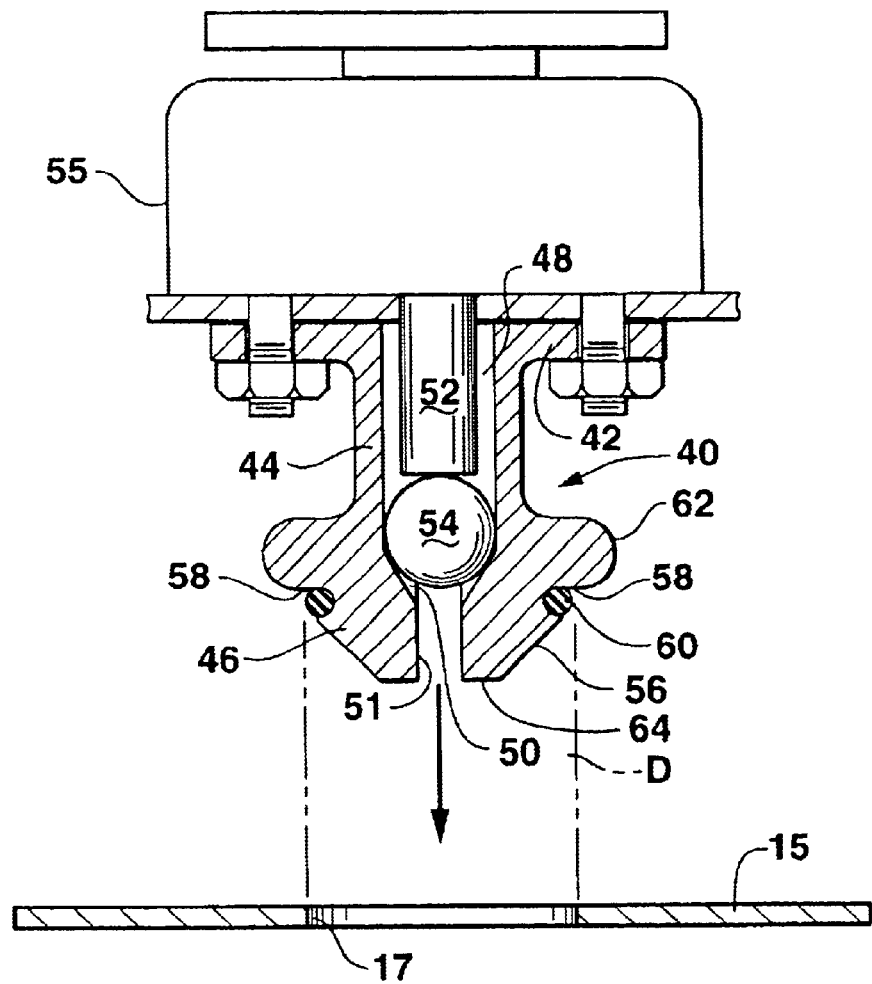
FIG. 4a is an enlarged view in partial section of the optical media pick device.
Figure 4B:
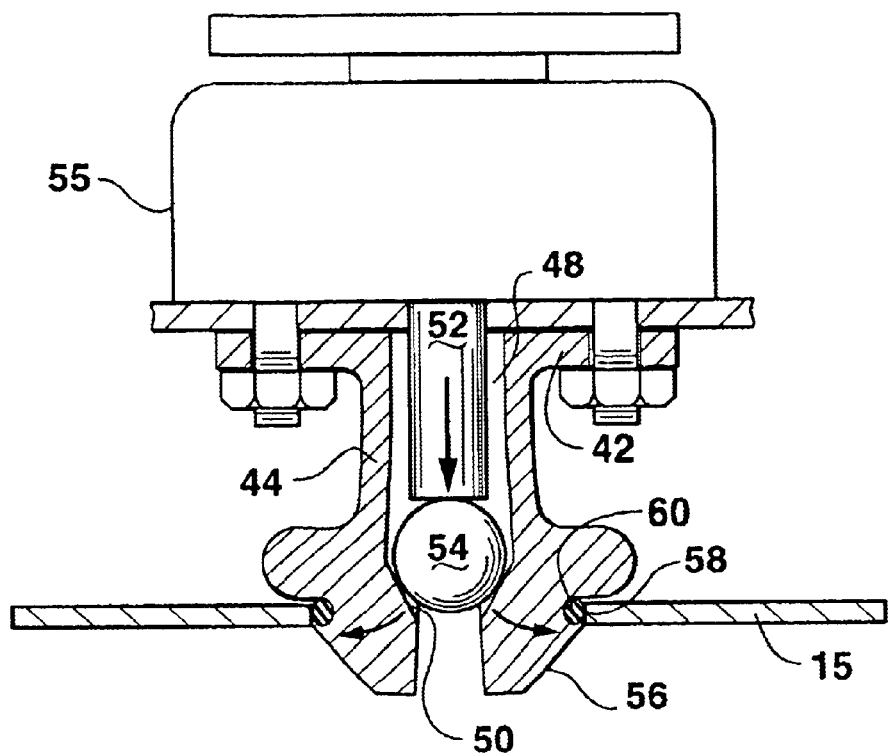
FIG. 4b is a view similar to FIG. 4a showing additional details of construction and operation of the pick device.
Figure 5:
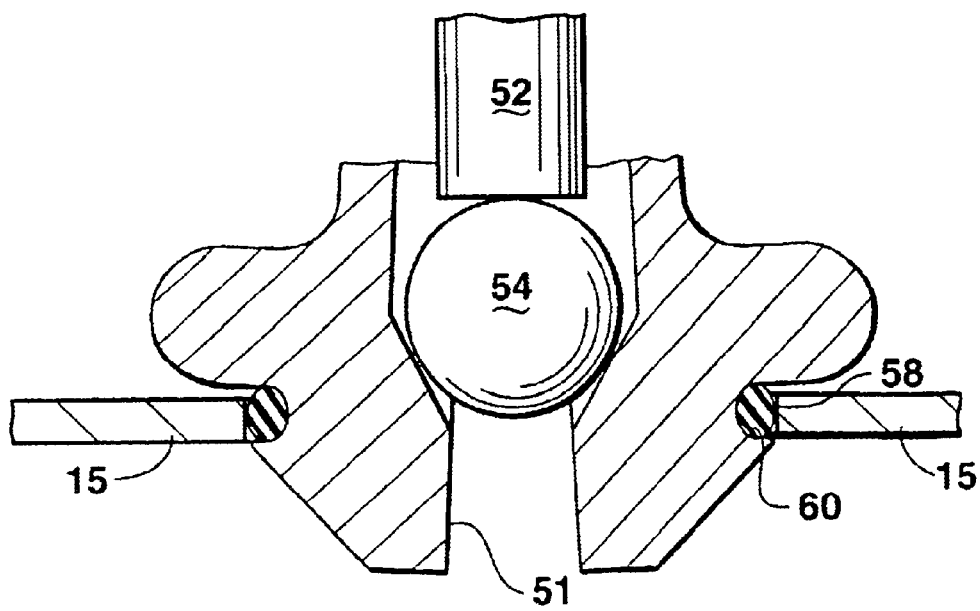
FIG. 5 is an enlarged view of FIG. 4b showing additional details of the pin and ball plunger arrangement used to expand the tip of the pick for engaging an optical media device.
Figure 6:
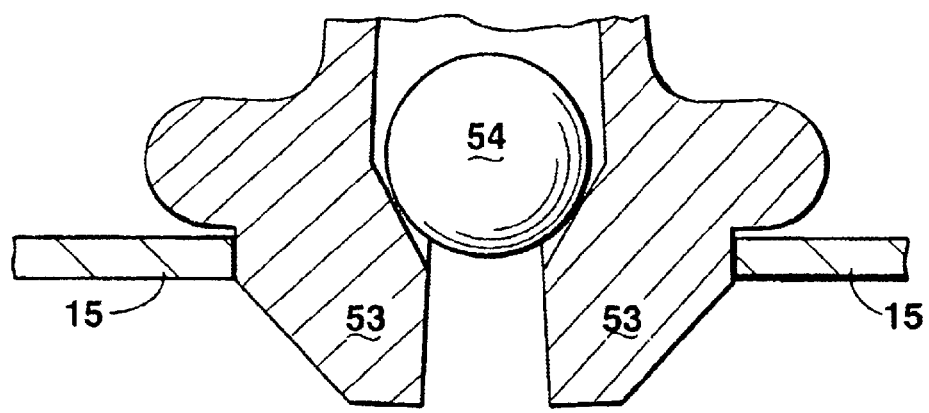
FIG. 6 is a view similar to FIG. 5 showing an alternative embodiment of the engagement by the pick of an optical media disc.

In one embodiment seen in reference FIG. 4a, tip 46 defines an outer tapered surtace 56 to guide and align CD 15 that terminates along an upper end with a notch 58. Notch 58 defines a circumferential groove on the exterior of tip 46. Tip 46 further defines an enlarged barb region 62 that is present along the opposite side of notch 58, barb 62 providing a stop mechanism when the tip is inserted into the hub of a CD. Reference lines "D" represent the diameter of the hub ring 17 of the aligned CD 15 and as illustrated, the diameter of ring 17 is slightly greater than the diameter of notch 58. An upper wall of barb 62 serves as a stop so as to maintain a desired position (FIG. 4b) in which the CD is substantially co-planer with the notch 58. As illustrated, an optional ring 60, such as a resilient "O"-ring, may be placed within the notch and has been found to offer improved performance of the pick. While the preferred embodiment of the tip 46 and tapered surfaces 56 are in reference to circular or conical structures, it is readily understood and appreciated by one having ordinary skill in the art that any geometric shape may be used which conforms to a similar shaped hub portion of a CD 15.

Pick 40 selectively engages and releases an individual CD 15 by an outward displacement of the segments 53. As seen in FIG. 4a, a plunger provided by a combination seen here as a pin 52 and ball 54, is housed within the passage 48 of the pick base and sleeve. In response to a solenoid 55, the pin 52 is extended axially toward tip 46, thereby pressing ball 54 against the narrower, tapering walls of the upper portion of passage 50. The diameter of ball 54 exceeds the diameter of passage 50, and thereby the ball pressure displaces each segment 53 in a radial direction as indicated by the directional arrows in FIG. 4b. The displacement places the notch 58 and ring 60 in engagement with the circular wall of hub 17, thereby securing the CD to the pick. The dimensions of notch 58 are such that only a single CD will be engaged. Further, the taper 56, beneath notch 58, facilitates the engagement of only a single CD from a stack of CDs.

Pick 40, carrying CD 15 may be positioned to a desired second location. The CD is released from pick 40 by the disengagement of the solenoid-controlled pin. As a result, the release of pressure on ball 54 allows the segments 53 to return to their original position in which the CD is no longer engaged.

Pick 40 may be constructed from plastic, nylon, or any similar material that maintains its flexibility over a large number of repeated flexing and expansion cycles. Further, the preferred materials of plastic or nylon are easily molded and/or cut to a desired shape. However, the pick 40 is not limited in construction to solely these materials inasmuch as metals, composites, and combinations of materials maybe used to construct a pick which may operate in a similar manner.

"O"-ring 60 has been found to improve the reliability of the engagement and the release of a CD from the notch 58. A resilient "O"-ring 60 provides a counteracting compressive force to the tip of pick 40. Accordingly, when the plunger is released from engagement with the interior passageways the "O"-ring helps restore the segments 53 to their original relaxed position. Similarly, the tapered surface 56 of tip 46 has been found to facilitate the engagement of a CD hub. However, with the precise alignment of the pick to the reference CD, the profile of tip 46 could be provided by a non-tapered, cylindrical wall. Tip 46 could further define a round or arcuate surface.

Figure 3:
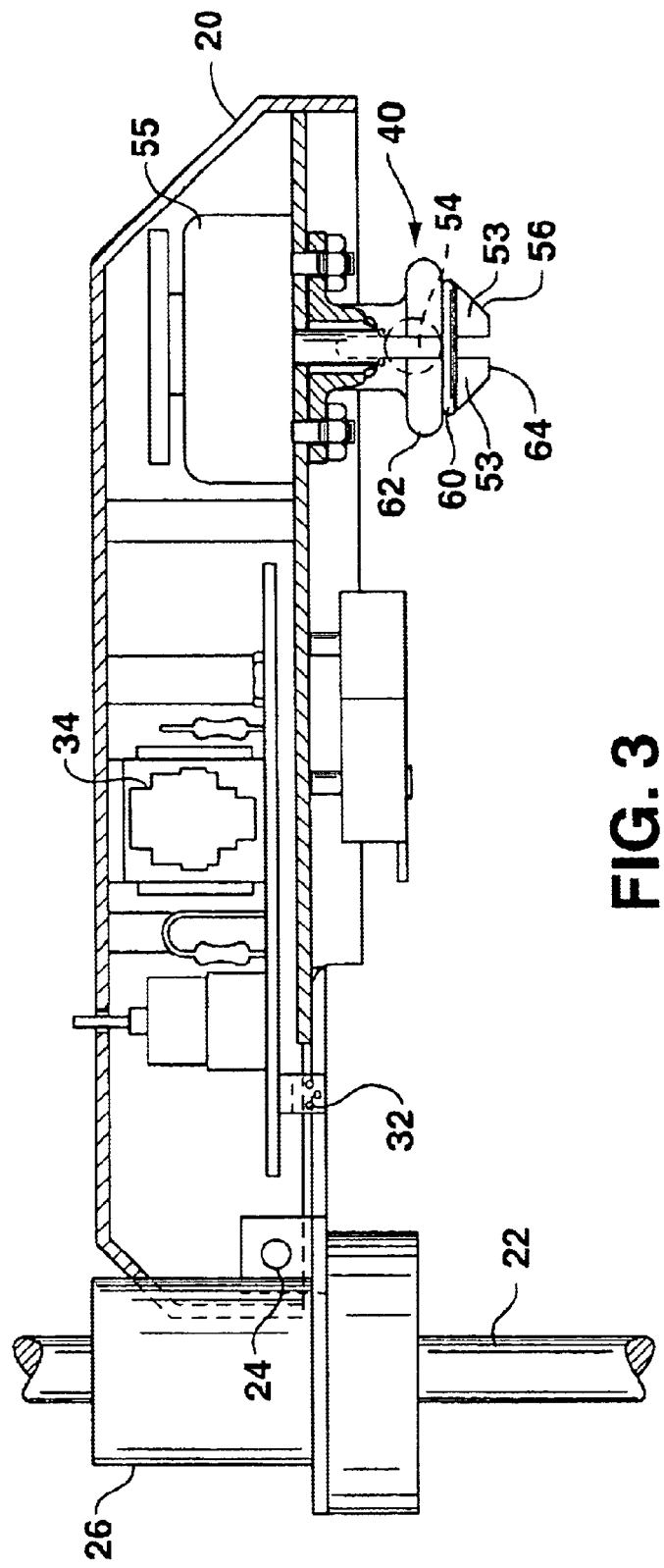
FIG. 3 is a side view of a partial section of the pick arm as seen in reference to FIG. 2.

As seen in reference to FIG. 3, arm 20 may be attached to actuator 26 via a pivot attachment 24. This arrangement provides a useful control mechanism such that when arm 20 and pick 40 engage a CD, arm 20 will pivot upwardly. A sensor 32, such as a light sensor may be used to detect the upward movement of arm 20. The sensor 32 will signal actuator 26 that arm 20 and pick 40 are in a proper position and thereby stops further movement along rail 22. The signal from sensor 32 will be used to further signal the required activation/deactivation of solenoid 55 so as to bring about the engagement or release of the reference CD. The control and regulation of pick 40 may be controlled through an electrical connection port 34 (FIG. 3) which allows for electrical interface to the autoloader unit's microprocessor based controller having appropriate software and hardware for regulating the CD controller cam.

The use of a plunger to selectively expand a resilient tip of the pick affords a simple, economical and reliable apparatus which can be used in conjunction with a wide variety of commercial equipment. While the passages 48 and 50 defined within the interior of pick 40 are seen as simple, tapered cylindrical passages, the shape of the passages could be varied. Similarly, the shape of the plunger and plunger tip could be varied if needed to facilitate the engagement and outward expansion of the tip segments. While the plunger is seen as a two-piece structure of a pin 52 and ball 54, it is envisioned that a unitary plunger could be provided having a shaft portion and a terminal head, the head engaging walls of passage 50. Upon disengagement of the plunger by the solenoid, the unitary plunger would be withdrawn and the flexible tip 46 will reassume initial configuration.

It is further understood and appreciated by those having ordinary skill in the art, that the above description and embodiments are directed to a standard sized CD. As dimensions and specifications within the optical media disc industry change, the dimensions of the pick may be varied accordingly to address these changes.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. An apparatus for engaging the center hub of an optical media disc comprising:

a pick having a first end, a second end, and defining a sleeve therebetween, the first end defining a base adapted for attachment to a positioning member and the second end defining a tip;

an axial passage defined by the pick and extending the length of the pick, the axial passage further defining an interior cross-sectional area along the base and the sleeve which is greater than the cross-sectional area of the axial passage defined within the tip;

the tip defining a plurality of slits, each one of said plurality of slits positioned substantially equidistance from each of an adjacent slit;

the tip defining a circular notch within an exterior surface of the tip;

wherein when the tip of the pick is inserted into a hub aperture of a media disc, the tip is pushed outwardly by a plunger inserted through the sleeve and engaging the axial passage wall of the tip, thereby pressing the notch against the hub, thereby securing the media disc to the pick.

2. The apparatus according to claim 1 wherein said plurality of slits further comprises:

a first slit defined by an exterior wall of the tip and at least a portion of the sleeve, the slit being in communication with the axial passage; and a second slit defined by an exterior wall of the tip and at least a portion of the sleeve, the slit being in communication with the axial passage, the first and second slit positioned on substantially opposite sides of the pick.

3. The apparatus according to claim 2 wherein said tip defines a taper between the notch and a terminus of the tip.

4. The apparatus according to claim 1 wherein the terminus of the tip defines a blunt surface.

5. The apparatus according to claim 1 wherein the tip further defines a shoulder which protrudes from the tip surface and is adjacent the notch.

6. The apparatus according to claim 1 wherein the notch is engaged by a resilient ring.

7. The apparatus according to claim 2 wherein the tip further defines a third slit and a fourth slit, said third and said fourth slit traversing the tip and at least a portion of the sleeve, said third and said fourth slit being in further communication with the axial passage and being substantially opposite the other.

8. The apparatus according to claim 1 wherein the axial passage of the sleeve houses a ball-bearing, the ball-bearing having an outer diameter greater than a diameter defined by the axial passage defined within the tip.

9. The apparatus according to claim 8 wherein the axial passage of the sleeve further carries a pin extending through the base and provides for selective engagement of the ball-bearing.

10. An apparatus for engaging a center hub of an optical media disc comprising:

a pick having a base, a tip, and an inter-connecting stem, the pick defining an axial passage defined along its length;

a conical taper defined by the exterior wall of the tip, the tip further defining a plurality of slits, each of said slits extending a length of the tip and at least a portion of said stem, each slit in communication with the axial passage;

a plunger operatively engaging the axial passage, the plunger defining a terminal head having a cross-sectional area greater than the cross-sectional area of a portion of the axial passage defined by the tip;

wherein, when the plunger engages the axial passage defined by the tip, the plunger engages the axial passage walls, extending the tip walls in a radial direction and thereby engaging the center hub of a disc.

11. The apparatus according to claim 10 wherein each slit is substantially parallel to the axial passage.

12. The apparatus according to claim 10 wherein the terminus of the tip defines a blunt surface.

13. The apparatus according to claim 10 wherein the tip further defines a shoulder which protrudes from the tip surface and extends circumferentially around the tip.

14. The apparatus according to claim 10 wherein the tip further defines a circular notch along an exterior surface of the tip.

15. The apparatus according to claim 14 wherein the notch is engaged by an "O"-ring.

16. The apparatus according to claim 10 wherein the plunger is provided by a combination of a pin and a ball.

17. The apparatus according to claim 10 wherein one of said each plurality of slits is positioned an equidistance apart.

18. The apparatus according to claim 10 wherein the plurality of slits is four, each slit spaced from each adjacent slit so as to provide for substantially equal segments of the tip.

19. The apparatus according to claim 10 wherein the pick is constructed from a plastic material.

20. An apparatus for the selective engagement and release of a center hub of an optical media disc comprising:
    a pick defining an axial passage therethrough, the pick having a first terminus and a second terminus, the second terminus defining a barbed tip having a plurality of axially defined segments, each segment formed by a pair of slits extending substantially along the length of the barbed tip;
    a groove defined by an exterior wall of the barbed tip; and,
    an "O" ring positioned within said groove.

21. The apparatus according to claim 20 wherein the axial passage is adapted for engaging a plunger defining a terminal head having a cross sectional area greater than the cross sectional area of a portion of the axial passage defined by the tip.

22. The apparatus according to claim 20 wherein each of the defined segments are substantially the same size.

23. The apparatus according to claim 20 wherein the barbed tip further defines a tapered surface.

24. A process of moving an optical media disc comprising:
    providing a pick having a hollow tip operatively engaged by an arm, the tip defining a plurality of segments, each segment being defined in part by a pair of spaced slits in communication with a cavity of the hollow tip;
    placing the tip at a first location adjacent an optical media disc;
    inserting a portion of the tip through a center ring of the optical media disc;
    positioning a plunger within the cavity of the tip, the plunger engaging each segment along an interior wall of the segment, and thereby expanding the circumference of the tip;
    engaging the center ring of the optical media disc by the expanding circumference of the tip;
    moving the position arm and the tip engaging the first optical media disc to a second location;
    withdrawing the plunger from an engaging position within the tip; and
    releasing the optical media disc from engagement with the tip.

25. A process according to claim 24 wherein the plunger comprises a positional pin which engages a ball seated within the cavity of the tip.

26. The process according to claim 24 wherein the optical media disc comprises a first disc situated along a stack of similar discs.

27. The process according to claim 24 wherein the second location is a drive tray for the optical media disc.

28. The process according to claim 26 wherein said stack of optical media discs is a horizontal stack.

29. The process according to claim 26 wherein the stack of optical media discs is a vertical stack.

30. The process according to claim 24 comprising the additional step of engaging an optical media disc from the second location using said pick and transporting the optical media disc to a third location.

31. The process according to claim 24 wherein the position arm is mounted on a rail, the arm being positionable along a length of the rail.

32. The process according to claim 31 wherein the positioning arm is pivotable about the rail.

* * * * *